(12) United States Patent
Wolff et al.

(10) Patent No.: US 7,935,447 B2
(45) Date of Patent: May 3, 2011

(54) USE OF CABIN AIR FOR GENERATION OF WATER VIA EXHAUST GAS OF A FUEL CELL

(75) Inventors: Christian Wolff, Ottobrunn (DE); Markus Maibach, Hamburg (DE); Claus Hoffjann, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 726 days.

(21) Appl. No.: 11/829,200

(22) Filed: Jul. 27, 2007

(65) Prior Publication Data

US 2008/0179050 A1 Jul. 31, 2008

Related U.S. Application Data

(60) Provisional application No. 60/820,493, filed on Jul. 27, 2006.

(30) Foreign Application Priority Data

Jul. 27, 2006 (DE) .......................... 10 2006 034 814

(51) Int. Cl.
*H01M 8/06* (2006.01)

(52) U.S. Cl. ........ 429/414; 429/450; 429/443; 429/434; 429/436; 165/177

(58) Field of Classification Search .................... 429/26, 429/30, 38, 39, 20, 12; 165/172, 177; 244/53 R
See application file for complete search history.

(56) References Cited

U.S. PATENT DOCUMENTS

| 3,135,322 | A | 6/1964 | Neugebauer | |
|---|---|---|---|---|
| 5,435,381 | A | 7/1995 | Downing et al. | |
| 2003/0235726 | A1* | 12/2003 | Kelly et al. | ..................... 429/20 |
| 2003/0235734 | A1* | 12/2003 | Haltiner et al. | ................. 429/26 |
| 2004/0089016 | A1* | 5/2004 | Axe et al. | ......................... 62/402 |
| 2005/0266287 | A1* | 12/2005 | Hoffjann et al. | ................. 429/26 |

FOREIGN PATENT DOCUMENTS

| DE | 279868 A | 10/1914 |
|---|---|---|
| DE | 102004034870 A1 | 2/2006 |
| DE | 102004058430 A1 | 6/2006 |
| DE | 102006002470 A1 | 3/2007 |
| WO | 2004/040680 * | 5/2004 |
| WO | 2004/067138 A2 | 8/2004 |

* cited by examiner

*Primary Examiner* — Raymond Alejandro
(74) *Attorney, Agent, or Firm* — Christopher Paradies; Fowler White Boggs P.A.

(57) ABSTRACT

A water generation system for the generation of water on board an aircraft comprises a fuel cell device having an exhaust for an exhaust gas, a condenser and an outflow valve for discharging cabin air, which is drawn off through the condenser due to the pressure difference between the cabin pressure and ambient pressure without extensive cooling circuits or pumps, for example. The condenser may be coupled to the exhaust such that the exhaust gas is cooled by cabin air, and the outflow valve is connected to the condenser and to the environment of the aircraft, such that, when the aircraft is at cruising altitude, the cabin air is drawn through the condenser and is discharged into the environment.

20 Claims, 3 Drawing Sheets

US 7,935,447 B2

USE OF CABIN AIR FOR GENERATION OF WATER VIA EXHAUST GAS OF A FUEL CELL

REFERENCE TO RELATED APPLICATIONS

This application claims the benefit of the filing date of German Patent Application No. 10 2006 034 814.1 filed Jul. 27, 2006 and of U.S. Provisional Patent Application No. 60/820,493 filed Jul. 27, 2006, the disclosure of which applications is hereby incorporated herein by reference.

FIELD OF THE INVENTION

The field relates to the generation of water on board aircraft. In particular, the field relates to a water generation system for the generation of water on board an aircraft, a condenser for condensing water from an exhaust gas from a fuel cell device on board an aircraft, the use of a water generation system of this kind, an aircraft and a method for the generation of water on board an aircraft.

BACKGROUND OF THE INVENTION

In aircraft, fuel cell arrangements can be used for the recovery of water from the fuel cell exhaust gas. Hereby, it is necessary to condense out the water contained in the exhaust gas flow water vapor by means of a condenser.

For the condensation of the water vapor, a cooling circuit may be provided to which two heat exchangers are coupled. This may involve a primary heat exchanger (PHE) and a secondary heat exchanger (SHE).

The condensation is performed hereby by indirect cooling by means of coolant, which is finally cooled by external air (see FIG. 1). This indirect cooling is necessary to prevent icing of the primary heat exchanger due to direct contact with external air, the temperature of which can be significantly below the freezing point of water. However, this arrangement may be complex and associated with a high overall system mass.

SUMMARY OF THE INVENTION

According to an embodiment of the water generation system, a water generation system for the generation of water on board an aircraft comprises a fuel cell device, a condenser for condensing water from an exhaust gas of the fuel cell device and an outlet, wherein the condenser is designed to cool the exhaust gas with cabin air and wherein the outlet is designed to discharge the cabin air to the environment of the aircraft when the cabin air has flowed through the condenser.

Thus, two cooling circuits may no longer have to be used. In addition, a pump or the like may no longer be necessary. The condenser is no longer (indirectly) cooled by external air but instead cooled by the on-board cabin air which is drawn through the outlet through the condenser. To do this, the outlet may be connected to the outer environment of the aircraft so that a pressure drop occurs when the aircraft is at cruising altitude which draws the cabin air through the condenser.

According to an embodiment of the water generation system, the condenser comprises at least one separation volume, whereby the separation volume is designed to change the direction of flow of the exhaust gas and for the separation of water.

The separated water may accumulate in the separation volume. The change in the direction of flow of the exhaust gas in the separation volume may also increase the rate of separation.

According to an embodiment of the water generation system, the separation volume is arranged at one side of the water generation system.

Obviously, a plurality of separation volumes may be each arranged at one of the sides of the water generation system. For example, the exhaust flow is guided through corresponding lines from the one side of the condenser to the other side and then arrives at a corresponding separation volume. Here, the flow is deflected and then flows through corresponding further lines to the other side of the condenser into a further separation volume. This process may be repeated several times until sufficient water has been condensed out or separated.

According to an embodiment of the water generation system, the water generation system comprises a perforated separating element through which the water accumulated in the separation volume may flow into an adjacent separation volume.

The two adjacent separation volumes are arranged one on top of the other for example, such that the water in the higher volume flows through the separating element (for example, a perforated partition) due to its weight force and/or due to the pressure difference between the upper region of the condenser and the lower region of the condenser in the underlying separation volume.

According to an embodiment of the water generation system, the water generation system further comprises two independent openings to remove the separated water.

These openings are each arranged in a side region of the condenser, for example. The first opening may be used, for example, to remove water which has accumulated at the left side of the condenser and the second opening may be used, for example, to remove water, which has accumulated on the right side of the condenser. Obviously, further openings for the removal of water may be provided.

According to an embodiment of the water generation system, the condenser is designed as a tubular heat exchanger comprising a plurality of lines for transporting the exhaust air. For example, the lines are arranged in different planes which lie one on top of another so that a whole battery of lines extending in parallel results. These lines have a tubular type design, for example, but could also have other cross sections, for example rectangular or square cross sections.

According to an embodiment of the water generation system, the directions of flow of the exhaust gas in the first plane and the second plane correspond, whereby planes arranged thereunder have an opposite direction of flow.

For example, the exhaust gas in three tube planes lying directly one on top of the other flows in the one direction, while it flows in the opposite direction in the three tube planes lying thereunder, etc.

According to an embodiment of the water generation system, the condenser is designed as a plate heat exchanger.

Other heat exchangers may be provided with a corresponding outlet, which discharges the cabin air from the aircraft into the environment, may also be used.

According to an embodiment of the water generation system, the outlet comprises a cabin air outflow valve.

This may enable the through-flow rate of the cabin cooling air to be controlled. If no through-flow is desired, the valve may be closed.

According to an embodiment of the water generation system, the water generation system further comprises an inlet to let the exhaust gas into the condenser. The inlet is hereby designed for connection to the fuel cell device. It may also be possible to provide a plurality of inlets to which a plurality of fuel cells can be connected. For example, the inlet has a large area so that the fuel cell exhaust gas is distributed as uniformly as possible when flowing into the condenser.

According to an embodiment of the water generation system, cabin air and exhaust gas flow against each other in the condenser.

For example, the cabin exhaust air introduced into the top left of condenser and brought out of the condenser at the bottom right. On the other hand, the cabin cooling air is supplied to the bottom side of the condenser and drawn out at the upper side of the condenser.

According to an embodiment of the water generation system, a condenser for condensing water from an exhaust gas from a fuel cell device on board an aircraft comprises an outlet, wherein the condenser is designed to cool the exhaust gas with cabin air and wherein the outlet is designed to discharge the cabin air into the environment of the aircraft when the cabin air has flowed through the condenser.

The condenser may therefore be connected to a fuel cell device in the aircraft. It is also connected to the cabin air outflow valve of the aircraft such that cabin air can be drawn through the condenser. Pumps or extra cooling devices or coolant may not be required.

According to an embodiment of the water generation system, an aircraft with a water generation system as described above is provided. Therefore, water may be generated on board the aircraft without a plurality of cooling circuits being required for this. After suitable processing, the condensed water can be used as drinking water during the flight as drinking water which enables, for example, the fill level of the water tank to be reduced on take-off.

Also provided is a method for the generation of water on board an aircraft in which exhaust gas from a fuel cell device is fed into a condenser. Cabin air is also fed into the condenser and the exhaust gas is cooled by the cabin air so that it condenses. The cabin air is subsequently discharged into the environment of the aircraft.

Further examples of the water generation system may be found in the subclaims.

The following describes preferred examples of the water generation system with reference to the figures.

BRIEF DESCRIPTION OF THE FIGURES

The representations in the figures are schematic and not to scale. In the following description of the figures, the same reference numbers are used for the same or similar elements.

DETAILED DESCRIPTION

The examples described and drawings rendered are illustrative and are not to be read as limiting the scope of the invention as it is defined by the appended claims.

Figure 1:
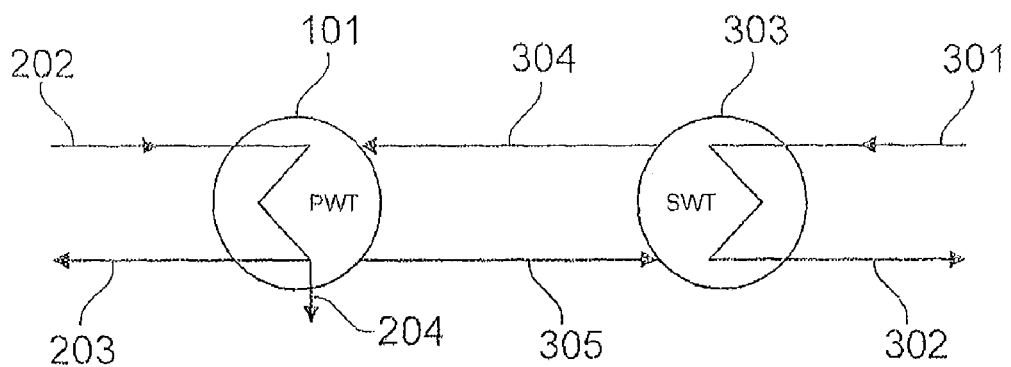
FIG. 1 shows a schematic representation of indirect cooling by means of coolant.

FIG. 1 shows a concept for indirect cooling by means of coolant. Hereby, a primary heat exchanger 101 is provided through which the fuel cell exhaust gas passes. The fuel cell exhaust gas enters the primary heat exchanger 101 through line 202 and leaves it through the outlet line 203.

Also provided is a secondary heat exchanger 303 comprising an inlet line for external air 301 and an outlet line for external air 302. At cruising altitude, the external air may have an effective temperature of approximately −20° C. or lower.

Provided between the primary heat exchangers 101 and the secondary heat exchangers 303 is a coolant circuit 304, 305 in order to ensure a heat connection between the two heat exchangers 101, 303 and on the other hand to prevent the icing of the primary heat exchanger 101. The cooling of the primary heat exchanger 101 results in the formation of water or condensate which can be discharged via the line 204.

The air-conditioning and ventilation technology already provided in civilian aircraft may also be used for the condensation of water vapor from fuel cell exhaust gases in order to simply and efficiently to achieve on-board water generation from fuel cell exhaust gases. For this, the heat exchanger/condenser can be arranged in a suitable manner in front of the cabin air outflow valve 102 so that, before being discharged outside, the air flows through the heat exchanger.

Figure 2:
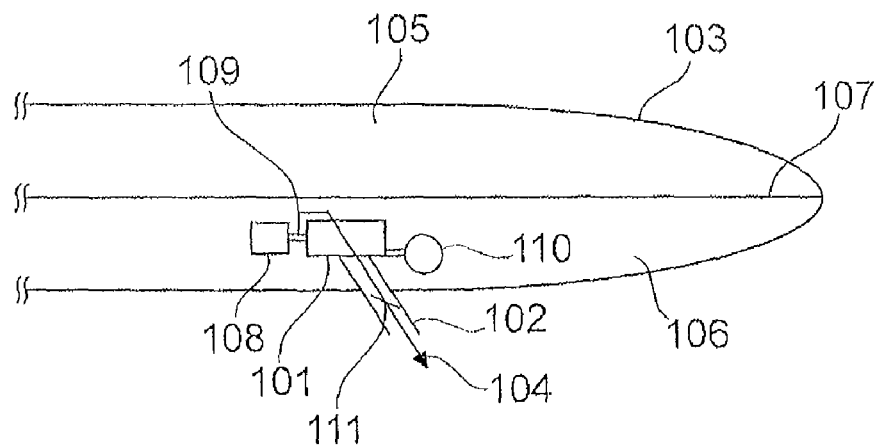
FIG. 2 shows a schematic representation of an example of a water generation system on board an aircraft.

FIG. 2 shows an example of a water generation system for the direct cooling of water vapor from fuel cell exhaust gas by means of outflowing cabin air. The water generation system, in this example, comprises a condenser 101, a fuel cell system 108 and at least one outlet 102.

A part of the air from the cabin 105 enters the lower region 106 of the aircraft fuselage. The region 106 is, for example, the cargo hold. However, the water generation system can also be arranged wholly or partially in the cabin. The lower region 106 and the cabin 105 are separated from each other by the floor 107.

In this example, the temperature of the cabin air may be approximately 20° C. with an absolute cabin pressure of approximately 750 millibar (abs). The air mass flow may be approximately 1.4 kg s$^{-1}$ per cabin air outflow valve 102.

The fuel cell 108 and condenser 101 are connected to each other by an exhaust gas line 109. A water store 110 for liquid water which is connected to the condenser, may be provided.

The cabin air outflow valve 102 can comprise a valve flap 111 which is electronically controllable so that the cabin air through-flow rate can be adjusted as desired.

After passing through the condenser 101, the cabin air 104 is discharged from the aircraft fuselage 103.

Therefore, heat may be discharged from the water-vapor-containing fuel cell exhaust gas by means of heat exchange into the outflowing cabin air which results in the condensation of water vapor in the fuel cell exhaust gas. After suitable processing, the condensed water may be used as drinking water during the flight which enables, for example, the fill level of the water tank to be reduced on take-off.

Figure 3:
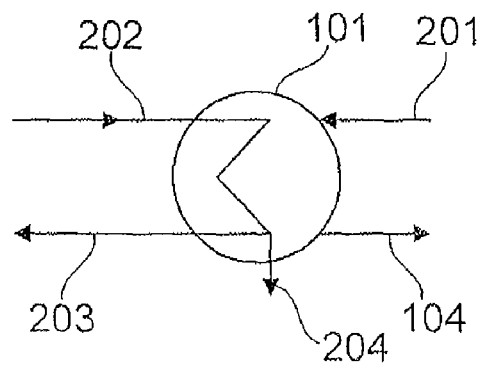
FIG. 3 shows a schematic representation of a condenser for the condensation of water vapor from fuel cell exhaust gas by means of direct cooling by cabin air according to an example of a water generation system.

FIG. 3 shows a schematic representation of a condenser for the condensation of water vapor from fuel cell exhaust gas by means of direct cooling by cabin air according to an example of a water generation system. The cooling cabin air 201 enters the condenser 101 and, when the fuel cell exhaust air has been cooled, leaves this through the outlet 104 via the cabin air outflow valve. The fuel cell exhaust gas 202 also enters the condenser 101, is cooled as appropriate and leaves the condenser 101 through the outlet 203. The condensed water is discharged via the line 204.

The following describes an example of an embodiment for condensation by means of cabin air with reference to an exhaust gas mass flow from an 100 kW PEMFC (proton exchange membrane fuel cell). Input values and calculation and design data are shown in the following tables and diagrams.

Table 1 shows a definition of a PEMFC exhaust gas:

TABLE 1

| Composition of the air fed to the condenser | Value | Unit | Value | Unit | Value | Unit |
|---|---|---|---|---|---|---|
| for lambda 2 (air ratio representing the oxygen content): | | | | | | |
| Overall | 100 | Mol % | 100 | Mass % | 0.17276 | kg s$^{-1}$ |
| Dry air | 85.0641 | Mol % | 90.1192 | Mass % | 0.15569 | kg s$^{-1}$ |
| H$_2$O | 14.9359 | Mol % | 9.8808 | Mass % | 0.01707 | kg s$^{-1}$ |
| Additional parameters for the precise layout and design: | | | | | | |
| Operating pressure of the exhaust gas fed to the condenser (abs): | 1.0 bar | | | | | |
| Operating temperature of the exhaust gas fed to the condenser (abs): | 54.1° C. (=dew point + 0.1) | | | | | |
| Desired condensation efficiency: | 50% (of the absolute water component) | | | | | |

Table 2 shows detailed layout and design parameters for a PEMFC tubular heat exchanger, cooled with cabin air (50% condensation efficiency). The condensation takes place in the tubes where the exhaust gas flow takes place. The outsides of tubes are cooled by cabin air:

TABLE 2

| Description | Type/Value | Dimension |
|---|---|---|
| Tube arrangement | Staggered arrangement | — |
| Type of flow | Cross-countercurrent | — |
| Type of lines | Smooth tubes | — |
| Outer diameter of the tubes | 12.5 | mm |
| Wall thickness of the tubes | 0.5 | mm |
| Longitudinal division of the tubes | 18.00 | mm |
| Transverse division of the tubes | 18.00 | mm |
| Length of the heat exchanger tubes | 450.00 | mm |
| Number of rows through which the flow passes | 3 | — |
| Number of tubes in the direction of flow | 39 | — |
| Number of tubes per plane (transversal) | 23 | — |
| Wall thickness of the condenser housing | 0.3 | mm |

Figure 4:
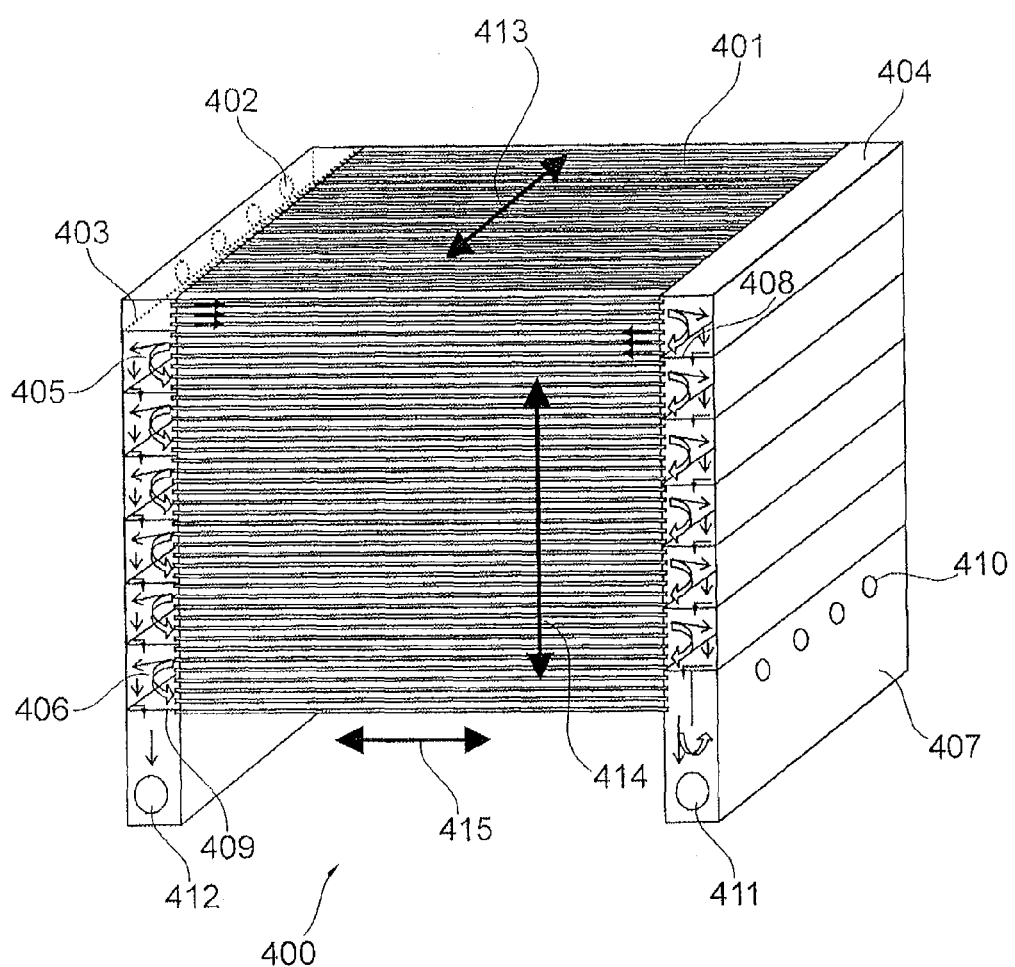
FIG. 4 shows a schematic structure of a tubular heat exchanger according to an example of a water generation system.

FIG. 4 shows a schematic detailed view of a tubular heat exchanger 400, such as may be used, for example, for a PEMFC fuel cell arrangement. The cooling is performed by cabin air with a condensation efficiency of, for example, 50%.

The exhaust gas enters at the upper left side 403 of the condenser 400 through inlets 402 with a variable design. Hereby, the inlets 402 may be designed with respect to their number, diameter, cross section in such a way that the exhaust gas is distributed as uniformly as possible when flowing into the condenser 400. The water generation system has a "triple flow" design, that is in each case, three tubes or tube planes extend in the direction of flow in order to achieve a sufficiently low flow rate of the exhaust gas. The exhaust gas is a low density medium so that lower flow rates have a positive impact on the condensation process (higher dwell time).

At each end of a row of tubes, the exhaust gas (including the condensate) flows into a separation volume (eg 404, 405, 406), in that the exhaust gas reverse its direction of flow and simultaneously condensate (water) can be separated onto the walls. The separated water can flow downward through the perforated partitions (eg 408, 409). The water which accumulates in the separation volumes 404, 405, 406 seals the perforated partitions 408, 409 toward the bottom so that the exhaust gases are unable to flow through the partitions 408, 409 but instead have to enter the continuing tubes.

The gravitational force and the pressure difference between the separation volumes support the water mass flow downward.

When the exhaust gas has crossed the cabin air cooling flow 23 times, the exhaust gas leaves the condenser 400 at the bottom right end 407 through corresponding outlet openings 410. The water may be removed at two independent outflow openings 411, 412 on the floor.

The condenser may also be designed as a plate heat exchanger. Lower cabin air temperatures increase the condensation efficiency or enable a reduction in the size of the condenser with the same condensation efficiency.

23 tubes are arranged, for example, in each plane (symbolised by the arrow 413). The number of tube planes arranged one on top of the other (symbolised by the arrow 414) is, for example, 39, which results in 13 deflections (separation volumes) of the cabin air cooling flow. The length 415 of an individual heat exchanger tube is, for example, 450 mm.

Table 3 shows relevant operating data for the PEMFC tubular heat exchanger, cooled with cabin air (50% condensation efficiency):

TABLE 3

| Parameters | Symbol | Value | Unit |
|---|---|---|---|
| General parameters: | | | |
| Cooling efficiency | Q | 22.27 | kW |
| Overall (average) heat transfer coefficient | k(eff, mean) | 70.54 | W m$^{-2}$ K$^{-1}$ |
| Heat transfer coefficient outside the tubes | α(o) | 223.58 | W m$^{-2}$ K$^{-1}$ |
| Heat transfer coefficient inside the tubes | α(i) | 112.33 | W m$^{-2}$ K$^{-1}$ |
| Thermal conductivity of the tube walls | λ | 23 | W m$^{-2}$ K$^{-1}$ |
| Heat exchanging surface | A | 15.85 | m$^2$ |
| Exhaust gas parameters (=inside the tubes): | | | |
| Inlet temperature | T(in) | 54.1 | ° C. |
| Inlet pressure (abs) | ρ(in) | 1.0 | bar |
| Total inlet gas mass flow | m(in) | 0.17276 | kg s$^{-1}$ |
| Absolute inlet water mass flow | m(in, H$_2$O) | 0.01707 | kg s$^{-1}$ |

TABLE 3-continued

| Parameters | Symbol | Value | Unit |
|---|---|---|---|
| Inlet dew point | DP | 54.0 | °C. |
| Outlet temperature (gas and water) | T(out) | 40.4 | °C. |
| Outlet mass flow of the gas | m(out, g) | 0.16396 | kg s$^{-1}$ |
| Outlet mass flow of the condensed water | m(out, H$_2$O) | 0.0088 | kg s$^{-1}$ |
| Absolute condensation efficiency | E(cond) | 51.6 | % |
| Pressure drop | Δp(gas) | 58.4 | mbar |
| Mean gas velocity | v(gas) | 24.17 | m s$^{-1}$ |
| Cabin air parameters (absolute cabin pressure: 750 mbar) | | | |
| Inlet temperature | T(in) | 20.0 | °C. |
| Outlet temperature | T(out) | 35.8 | °C. |
| Mass flow | m(air) | 1.4 | kg s$^{-1}$ |
| Pressure drop | Δp(air) | 52.1 | mbar |
| Air velocity | v(air) | 29.37 | m s$^{-1}$ |

Table 4 shows masses and volumes for the PEMFC tubular heat exchanger cooled with cabin air (50% condensation efficiency):

TABLE 4

| General data | |
|---|---|
| Total volume of the condenser | Approximately 176.1 L (=792 × 530 × 419.5 mm$^3$) |
| Total number of heat exchanger tubes | 897 (=39 × 23) |
| Total length of the heat exchanger tubes | 403.65 m (=897 × 450 mm) |
| Internal total volume of the heat exchanger tubes | Approximately 41.92 L (403650 × 103.86 mm$^3$) |
| Total volume of the metal of the heat exchanger tubes | Approximately 7.61 L (=403650 × 18.85 mm$^3$) |
| Total volume of the metal of the four plates arranged directly around the condenser | 0.37 L (=[450 + 450 + 419.5 + 419.5] × 702 × 0.3 mm$^3$) |
| Total volume of the metal of the additional housing (outer wall, water-separator, frame) | Approximately 0.3 L (=2 × [792 × 419.5 × 0.3 mm$^3$] + 13 × [419.5 × 40 × 0.3 mm$^3$] + 2 × [90 × 40 + 90 × 40 + 90 × 419.5 + 40 × 419.5] × 0.3 mm$^3$] |

| Masses | | |
|---|---|---|
| | High-grade steel (density: 7850 kg m$^{-3}$) | Aluminium (density: 2700 kg m$^{-3}$) |
| Overall mass of the metal of the heat exchanger tubes | Approximately 59.8 kg | Approximately 20.6 kg |
| Overall mass of the metal of the metal plates, directly abutting the condenser | Approximately 2.9 kg | Approximately 1.0 kg |
| Overall mass of the metal of the housing | Approximately 2.4 kg | Approximately 0.8 kg |
| Overall mass of the condenser | Approximately 65.1 kg | Approximately 22.4 kg |

In the case of titanium (density: 4510 kg m$^3$), the condenser weights approximately 37.3 kg. In the case of zirconium (density: 6500 kg m$^3$), the condenser weights approximately 53.8 kg.

Obviously, larger or smaller condensers may be used.

Figure 5:
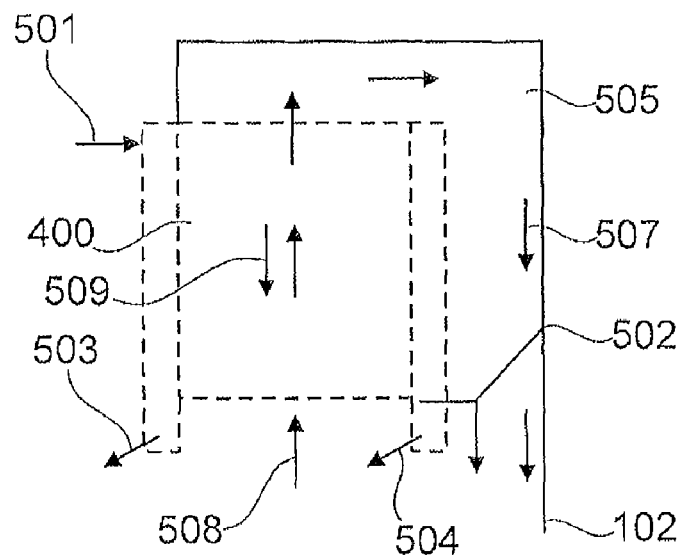
FIG. 5 shows a schematic representation of the air guidance through a water generation system according to an example of a water generation system.

FIG. 5 shows a schematic representation of the air guidance through an example of a water generation system. For integration in the aircraft, a countercurrent may occur between the cabin air flow and fuel cell exhaust gas and nevertheless, both the water and the cabin air are able to flow effectively "downward." A countercurrent of this kind may increase the effectiveness of the heat exchanger. This may be achieved by a special air conduction 505 which is shown in FIG. 5. While the exhaust gas from "top" 501 to "bottom" 502 (as symbolised by the arrow 509) and hence the condensate removal 503, 504 is encouraged, the cabin air 508 initially flows through the condenser "upward", which enables the countercurrent in the condenser. The cabin air is then guided back downward by a suitable device 505 (see arrow 507). There, it is able to flow outside through the cabin air outflow valve 102. In addition to this, the rest of the exhaust gas can also be guided outside via the cabin air outflow valve 102 (see arrow 502).

Figure 6:
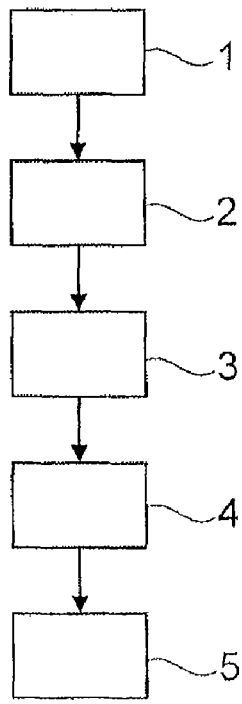
FIG. 6 shows an example of a flow diagram method according to an example of a water generation system.

FIG. 6 shows a flow diagram of a method according to an example of a water generation system. In Step 1, exhaust gas from a fuel cell device is introduced into the condenser. In addition to this, cabin air in introduced into the condenser. In Step 2, the exhaust gas is cooled by the cabin air. In Step 4, water is condensed from the exhaust gas and can be fed into the aircraft's water circuit. In Step 5, the cabin air is discharged together with the exhaust gas into the environment of the aircraft when the cabin air and the exhaust gas have flowed through the condenser.

In addition, reference is made to the fact that "comprising" does not exclude any other elements or steps and "one" does not exclude a plurality. Furthermore, reference is made to the fact that features or steps which are described with reference to one of the above examples of embodiments can also be used in combination with other features or steps of the other examples of embodiments described above. Reference numbers in the claims should not be seen as a restriction.

What is claimed is:

1. A water generation system for the generation of water on board of an aircraft, the water generation system comprising:
   a fuel cell device having an exhaust for an exhaust gas;
   a condenser coupled to the exhaust of the fuel cell device such that the exhaust gas is cooled by cabin air, wherein the condenser comprises:
   an exhaust inlet fluidically coupling the exhaust gas from the fuel cell device with a condenser element;
   an outlet in fluid flow communication with the condenser element, the outlet comprising an outflow valve, such that the condenser element is capable of cooling the exhaust gas using cabin air, such that water is extracted from the exhaust air, and the outflow valve couples the condenser to an environment outside of the aircraft, such that a pressure drop occurs when the aircraft is at cruising altitude and the cabin air is drawn through the condenser and discharges into the environment outside of the aircraft after the cabin air has passed through the condenser element; and
   at least one separation volume, wherein the at least one separation volume changes a direction of flow of the exhaust gas within the condenser and separates water from the exhaust gas as the direction of flow of the exhaust gas is redirected back through the condenser element by the at least one separation volume.

2. The water generation system according to claim 1, wherein the at least one separation volume is arranged at one side of the water generation system.

3. The water generation system according to claim 1, further comprising:
   a perforated separating element, through which the water accumulated in the at least one separation volume can flow into an adjacent separation volume.

4. The water generation system according to claim 1, further comprising:
two independent openings to remove the water from the separation volume.

5. The water generation system according to claim 1, wherein the condenser is a tubular heat exchanger comprising a plurality of lines for transporting the exhaust gas.

6. The water generation system according to claim 5, wherein a plurality of first lines are arranged in an first plane,
a plurality of second lines are arranged in a second plane, and
the first plane is disposed on top of the second plane or the second plane is disposed on top of the first plane.

7. The water generation system according to claim 6, wherein a direction of flow of the exhaust gas in the first plane and the second plane correspond to each other, and additional planes arranged thereunder have an opposing direction of flow.

8. The water generation system according to claim 5, wherein three planes having a plurality of lines in each plane are arranged one on top of another and the same direction of flow of the exhaust gas is directed through the three planes.

9. The water generation system according to claim 1, wherein the condenser is a plate heat exchanger.

10. The water generation system according to claim 1, wherein the outlet comprises a cabin air outflow valve.

11. The water generation system according to claim 1, further comprising:
an inlet coupling the fuel cell device to the condenser such that the exhaust gas is directed into the condenser.

12. The water generation system according to claim 1, wherein the direction of flow of cabin air is opposite of the direction of flow of exhaust gas in the condenser.

13. The system of claim 1, wherein the outflow valve adjustably controls the flow of cabin air through the condenser without the use of a pump when the aircraft is at cruising altitude.

14. The system of claim 13, wherein the at least one separation volume comprises a plurality of separation volumes including a first separation volume on a first side of the condenser and a second separation volume on a second side of the condenser, opposite from the first side of the condenser, and the first separation volume changes the direction of the flow of the exhaust gas, wherein the exhaust gas entering the first separation volume is redirected back into the condenser element and towards the second separation volume.

15. The system of claim 14, wherein the exhaust gas redirected by the first separation volume enters the second separation volume, and the second separation volume redirects the exhaust gas back into the condenser element and towards a third separation volume disposed on the first side of the condenser, adjacent to the first separation volume.

16. The system of claim 15, wherein each of the plurality of separation volumes comprises perforations extending through a floor such that, while the direction of the exhaust gas is redirected within each of the plurality of separation volumes, the water condensed from the exhaust gas in the condenser passes through the perforations, separating the water from the exhaust gas.

17. An aircraft comprising a water generation system according to claim 1.

18. A method for using the system of claim 1 for generating water on board an aircraft, the method comprising the steps of:
introducing exhaust gas from the fuel cell device into the condenser of the water generation system of claim 1;
opening the outflow valve such that the cabin air of the aircraft is drawn through the condenser by the pressure drop between the cabin air pressure and the pressure of the environment outside of the aircraft during operation of the aircraft at a cruising altitude;
condensing water from the exhaust gas within the condenser, the condensing step comprising changing the direction of flow of the exhaust gas within the at least one separation volume; and
separating water condensed during the step of condensing from the exhaust gas within the at least one separation volume.

19. A condenser for condensing water from an exhaust gas from a fuel cell device on board of an aircraft, the condenser comprising:
an exhaust inlet fluidically coupling the exhaust gas from the fuel cell device with a condenser element;
an outlet in fluid flow communication with the condenser element, the outlet comprising an outflow valve, such that the condenser element is capable of cooling the exhaust gas using cabin air, such that water is extracted from the exhaust air, and the outflow valve couples the condenser to an environment outside of the aircraft, such that a pressure drop occurs when the aircraft is at cruising altitude and the cabin air is drawn through the condenser and
discharges into the environment outside of the aircraft after the cabin air has passed through the condenser element; and
at least one separation volume, wherein the at least one separation volume changes a direction of flow of the exhaust gas within the condenser and separates water from the exhaust gas as the direction of flow of the exhaust gas is redirected back through the condenser element by the separation volume.

20. The condenser according to claim 19, wherein the at least one separation volume includes a plurality of separation volumes, including a first separation volume and a second adjacent separation volume, separated from the first separation volume by a perforated separating element such that water accumulating in the first separation volume flows into the second adjacent separation volume through a plurality of perforations extending through the perforated separation volume.

* * * * *